Feb. 28, 1928.
R. M. BIRD
1,660,828
ELECTRIC FUSE
Filed Dec. 1, 1922
2 Sheets-Sheet 1
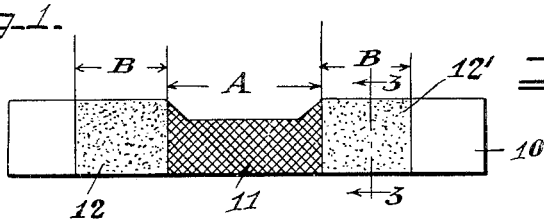
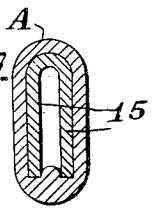
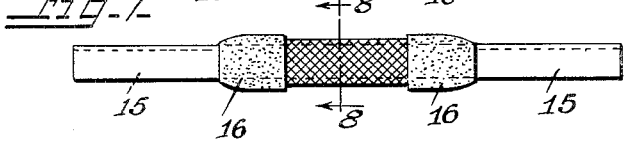
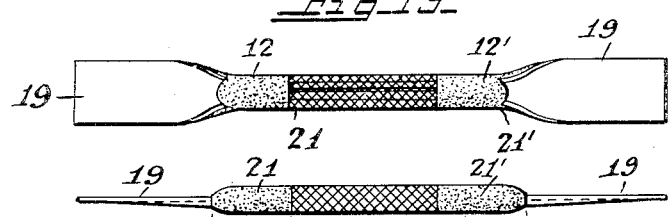
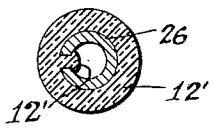
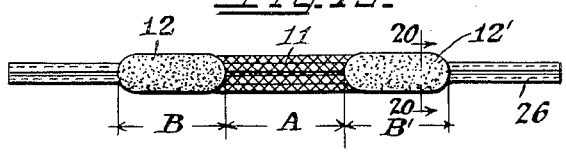
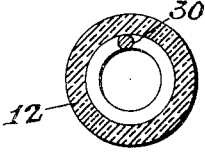
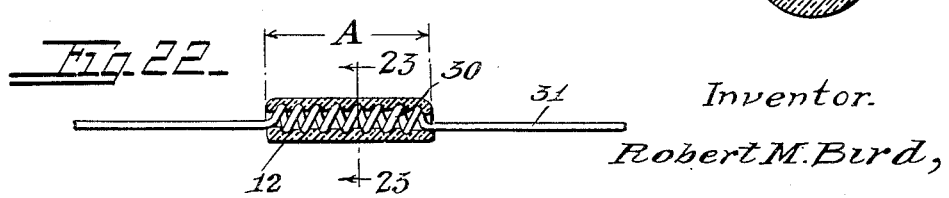
Inventor.
Robert M. Bird,
By his Atty,
Harold D. Penney Feb. 28, 1928.
R. M. BIRD
ELECTRIC FUSE
Filed Dec. 1, 1922
1,660,828
2 Sheets-Sheet 2
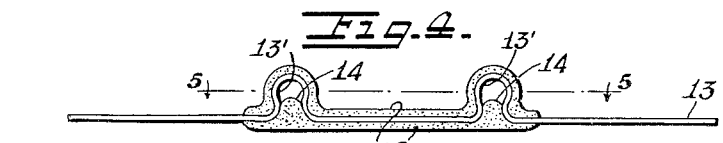
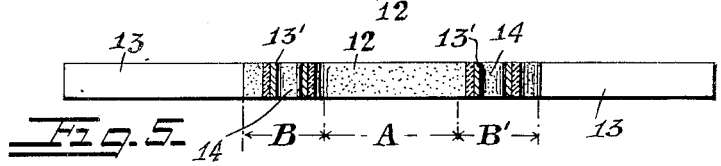
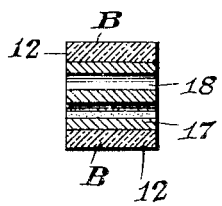
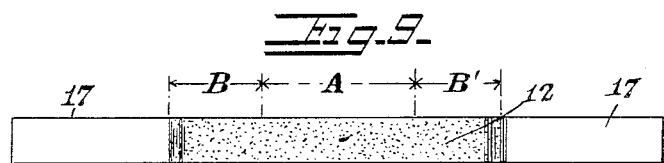
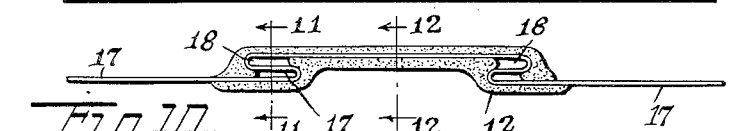
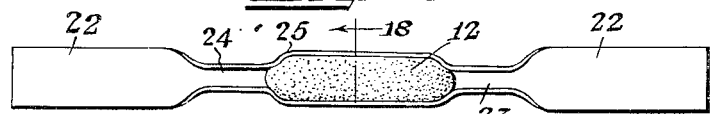
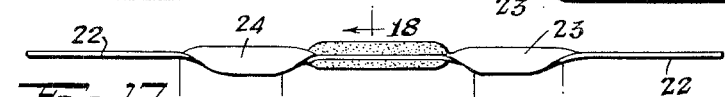
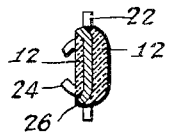
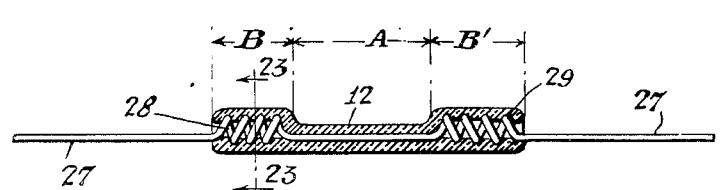
Inventor
Robert M. Bird,
By his Atty
Harold D. Penney Patented Feb. 28, 1928.

1,660,828

UNITED STATES PATENT OFFICE.

ROBERT M. BIRD, OF CHARLOTTESVILLE, VIRGINIA.

ELECTRIC FUSE.

Application filed December 1, 1922. Serial No. 604,249.

This invention contemplates the modification of electrical fusible links of the well known type by the introduction of new features to be hereinafter noted in detail.

In order to utilize the new principles involved, advantage is taken of certain natural phenomena in the action of metals through their convection, conduction, absorption and radiation qualities as regards heat or electrical energy, or both, whereby to cause the fuse of a given cross sectional area to fuse rapidly and in a safe manner under control of the above conditions, the cross sectional area of such metal in my improved fuse being modified by the shape of my fuse and the covering or coating thereon, and such modifications of shape and coating modify the amperage at which a fuse of given cross sectional area will blow out.

One of the underlying features of the present invention relates to the manner in which the fuse element is evolved and which in its simplest form may be folded or turned or otherwise shaped so as to give forms in which layers of metal absorb the heat radiated by other superimposed layers of metal separated from one another by desirable substances. Other forms of fuse may be made from flat or other shaped metal whereby a desired amount of surface area of the fuse is placed in opposition to other surfaces of the same element, whereby to oppose heat radiating surfaces of the same fuse to one another in any desired proportion. It will be disclosed as the description proceeds that the opposing in any maximum or minimum amount of surface areas of the fuse element itself, the radiation of heat generated by the passage therethrough of electric current will be radiated and absorbed under the well known laws to any desired degree whereby to more rapidly approach the melting point of the metal of the fuse element, thereby to obtain a quick clean break of the fusible element under the conditions of short circuiting or overload.

Inasmuch as the heat radiation and absorption capacity of like surface areas of different samples of any metals are substantially equivalent, it therefore becomes obvious that by the opposing in a single element of any predetermined or desired amount of surface area to other component surface areas of said fuse, the amount of heat accumulation within the body of the fuse element itself is under absolute control for the purpose above stated.

One or more cross-sections of the fuse-link may be covered or coated, either inside the folds, or both inside or outside, with an electrically conducting layer of a substance which is different from that of the fuse metal itself in its electrical resistivity and heat conductivity.

Another advantage of my improved device is that in addition to the opposing of the desired surface areas of the fuse for the localizing and building up of the generated heat for the purpose of causing a quick fusing and clean break, that another modification may be made for modifying the heat action of this fuse element to any desired degree of action. This consists in covering the fuse element at any portion thereof, but preferably on either side of the middle blow-out section, with a preferably dielectric covering or coating of any desired degree of heat absorption quality and fusibility.

I have found by covering a fuse-link as set forth in the previous paragraphs with the last mentioned dielectric coating, that by this means I not only direct the melting of the fuse at the desired points, but I also create a predetermined zone of any desired length of the fuse-link between the ends cf said fuse-link, whereby the middle section first melts and breaks down, the arc burns up this metal and also that enclosed in the ends of the dielectric coating on either side of the blow-out section. The metallic oxide formed is itself a dielectric and is held in place within the ends of the coated sections that remain. The two unconsumed sections of the link thus remain completely insulated from each other, this feature being augmented by the dielectric coating which effectively coats over the ends of the unconsumed metal; a gap is thus created, which is in length determined by the distance between the far ends of the two dielectric coatings.

The dielectric coating (*a*) diminishes the quantity of metal consumed when the fuse "blows out." (*b*) Shortens the arcing period after a section has melted and the metallic circuit has been broken. (*c*) After a section of the fuse-link has blown out, the unconsumed portions of the fuse-link are automatically insulated from one another, and hence the current is completely and permanently broken. (d) Because of the diminished quantity of metal consumed when the fuse blows out and the shortened arcing period after a section has melted and the metallic circuit has been broken, the quantity of heat generated on blowing of the fuse is materially lessened and the damage to the fuse-link container and surroundings is diminished.

In addition to the foregoing, the above noted coating, the melting point of which is desirably higher than that of the metal of the fuse portion, maintains the fuse in its connectivity to the remainder of the fuse, thereby supporting the fuse under certain conditions of short circuiting until the heat thereof has become sufficient to cause a quick, clean break, as described, under conditions of rise in amperage, and helps to regulate the distribution of the temperature along the fuse-link and effectually controls or confines a portion of the heat generated by a rise in amperage to the fuse itself, without rapid distribution to its surroundings.

The foregoing form of fuse tends to shorten the arcing period through reducing the amount of metal vaporized or changed, and which vapors or changed elements, when in sufficiently large quantity or volume, as in the old renewable type of fuse, would tend to support a continued arcing, creating higher pressure in the cartridge and creating a high temperature in its surroundings, and otherwise diminish effectiveness and life of the cartridge casing.

Under certain government specifications, and underwriters', for high tension cartridge fuses, it is required that a cartridge shall stand the blowing of a specified number of fuses without destroying the cartridge casing. This device will increase the life of the cartridge or casing for this use, permitting a larger number of fusings to occur without destruction of the cartridge casing by reason of the fact that by the use of my fuse the arcing period is greatly reduced and the consequent subjection of the cartridge housing to shorter arcing periods lengthens its life, internal pressures are reduced and the consequent deterioration of the interior surface of the cartridge and its connections are also reduced through the minimum amount of metallic vapors and other chemical and physical changes occurring within the interior thereof.

Another advantage of my above noted method of construction is that a higher than usual degree of standardization, as to the amperage at which fuses of like ratings will blow out, is acquired; while as is well known in the ordinary strip or wire type fuses, such as are now ordinarily used, it is commercially impossible and impracticable so to make these fuses that the volumetric area of any given gauge of wire or strip shall be exactly alike throughout its length. It is also obvious that any variations, such as occur in either the gauge or the diameter thereof, are sufficient to make any given fuse variable in its electrical resistance throughout its length and such variability is not under control in manufacture of fuses. In other words, the variation in some fuses may be that while throughout its length it is within satisfactory tolerances as to gauge, it may have one point where the thickness or the diameter is less than some other point, thereby causing the fuse to operate too early on the rising of loads, and, on the other hand, if a fuse should have a thicker point at some place in its length, or the fuse should be cut from a thicker part of the metal, in manufacture, its conductivity would be greatly increased and therefore delay the point of fusing until the electrical pressure had risen beyond the desired point for a link of given rating.

One object of the invention is to provide an electric conducting fuse or fuse-link involving superimposed layers of electrically conducting material which promote:

(a) A concentration at predetermined points of the heat effects produced by a passage of an electric current.

(b) A quicker and more certain "blow-out" of the fuse at a predetermined point or points, when the amperage of the current exceeds a specified value through a short-circuit or otherwise.

(c) A material reduction of the "lag", that is, a cutting down of the period of time required between the period of overload and the blowing of the fuse, through the excessive rise of amperage.

(d) A higher standardization of fuses of given ratings by diminishing the ill effects due to unavoidable variations in the thickness of the metal from which the fuses are fashioned, and the consequent variation in current carrying capacity at different places.

Another object is to provide an electrically conducting fuse or fuse-link of any form or cross-section coated or covered in part or whole with a substance, material or covering which promotes the effects above set forth.

Another object is to promote the maintenance of the electric current in the fuse or fuse-link until the temperature of certain predetermined parts of the fuse-link shall have reached a limit that would normally occasion a parting of the fuse-link.

Another object is to electrically insulate, totally or partially, the different portions of the fuse-link after breaking or parting has taken place in the usual manner (that is, when the fuse-link has "blown out").

Another object is to promote the quenching of the arc which forms when a fuse-link breaks in the normal manner.

Another object is to aid in limiting the period of time during which an arc persists after a breaking or fusion of the parts of the fuse-link occurs.

In the accompanying drawings, which show a number of the possible embodiments of the invention, and which drawings form part of this specification, Figure 1 is a side view of one form of fuse or fuse-link before it is folded.

Figure 2 is an end view from either end of the fuse-link shown in Fig. 1, showing one manner of turning or folding or forming the metal strip.

Figure 3, is a cross-sectional view of the fuse-link shown in Fig. 1, on each side of the middle blow-out section, on an anlarged scale, showing the formation of the metal strip and dielectric coating which remains intact after blowing.

Figure 4 is a side view of another form of fuse-link.

Figure 5 is a plan view of the fuse-link shown in Fig. 4, on each side of the middle blow-out section, looking in the direction of the arrows.

Figure 6 is a side view of another form of fuse or fuse-link.

Figure 7 is a plan view of the fuse-link shown in Fig. 6.

Figure 8 is a sectional view on the line 8—8 of Fig. 7, looking in the direction of the arrows and on an enlarged scale.

Figure 9 is a plan view of another form of fuse or fuse-link.

Figure 10 is a side view of the fuse-link shown in Fig. 9.

Figure 11 is a sectional view on the line 11—11 of Fig. 10, looking in the direction of the arrows and on an enlarged scale.

Figure 12 is a sectional view on the line 12—12 of Fig. 10, looking in the direction of the arrows and on an enlarged scale.

Figure 13 is a plan view of another form of fuse or fuse-link.

Figure 14 is a side view of the fuse-link shown in Fig. 13.

Figure 15 is a sectional view on the line 15—15 of Fig. 13, looking in the direction of the arrow and on an enlarged scale.

Figure 16 is a plan view of another form of fuse-link.

Figure 17 is a side view of the fuse-link shown in Fig. 16.

Figure 18 is a sectional view on the line 18—18 of Fig. 16, looking in the direction of the arrow and on an enlarged scale.

Figure 19 is a side view of another form of fuse-link.

Figure 20 is a sectional view on the line 20—20 of Fig. 19 and on an enlarged scale.

Figure 21 is a longitudinal vertical sectional view of another form of fuse-link.

Figure 22 is a longitudinal sectional view of a modification of the form of fuse shown in Fig. 21, and Figure 23 is a sectional view on the line 23—23 of either Figure 21 or 22, and on an enlarged scale.

Similar reference characters denote similar parts throughout the several views.

Referring to Figs. 1, 2 and 3, the fuse or fuse-link is a flat strip 10 of fusible electrically conductive metal, which is folded or turned or otherwise shaped to provide layers or folds of metal for absorbing the heat radiated by other layers or folds of the metal, the layers or folds being separated from each other.

The middle cross-section of the fuse-link is covered, preferably at its mid portion, as at 11, either inside the layers or folds, or both inside and outside, with an electrically conducting substance which is different from the fuse metal itself in its electrical resistivity and heat conductivity, one such substance being bismuth. The fuse-link is covered as at 12 and 12' with a dielectric substance such as glass, or enamel or a cement or other material of analogous electrically non-conducting and electrically insulating properties, the portions of the fuse-link so covered being spaced apart or separated by the portion of the fuse-link covered with the substance first above stated. I thus provide for a fuse-link a middle predetermined blow-out section or zone A having on either side thereof a section or zone BB' of restricted radiation. When the current exceeds a specified value the middle section or zone A of the fuse-link first melts and breaks down, with a time lag that is less than that which occurs in the usual types of fuse-links, the arc burns up the metal of the section or zone A and also a small portion of the metal enclosed in the sections or zones BB'. The metallic oxide formed is itself a dielectric and is held in place within the ends of the sections or zones BB'. The two unconnected sections of the link thus remain completely insulated from each other, this feature being augmented by the fusion of the dielectric covering which coats over the ends of the unconsumed metal, and a gap is thus created the length of which is determined by the distance between the far ends of the two dielectric coverings.

Referring to Figs. 4 and 5, the fuse or fuse-link is a strip 13 of fusible electrically conductive metal which has formed thereof the turns or loops 13' spaced apart from each other and providing opposed internal heat radiation surface areas. The strip 13 between the turns or loops 13' is covered with a dielectric substance 12 such as mentioned. The loops 13' and for a distance outwardly thereof, are covered with the same dielectric substance, the dielectric substance extending somewhat into the turn of the loops as per 14; and a predetermined drop-out zone A and the blow-out zones BB' of restricted radiation for the link are thus provided. When the current exceeds a specified value the zones BB' first melt and break down and the zone A drops out.

Referring to Figs. 6, 7 and 8, the fuse or fuse-link is a strip 15 of fusible electrically conductive metal, this strip in cross-section being of U-shape providing opposed internal heat-radiation surface areas. The strip 15, at portions 16 thereof, spaced apart by a portion of the strip, is coated either outside or both outside and inside with the dielectric substance before mentioned, and the intervening portion is covered with the substance such as bismuth, and thus a predetermined blow-out zone A and zones BB' of restricted radiation for the link are provided. When the current exceeds a specified value the zone A first melts and breaks down and the consequent actions are the same as those heretofore described.

Referring to Figs. 9, 10, 11 and 12, the fuse or fuse-link is a strip 17 of fusible electrically conductive metal having therein the S-shaped, in cross-section, turns or loops 18 spaced apart from each other providing opposed internal heat radiation surface areas. The strip 17, for its length between the turns or loops 18, is covered with the dielectric substance 12 before mentioned, and said loops or turns and a portion of the strip adjacent thereto on the outer side of the loops or turns, are covered with this same dielectric substance, and predetermined drop-out zone A and zones BB' of restricted radiation for the link are thus provided. When the current exceeds a specified value the loops 18 first melt and the zone A drops out.

Referring to Figs. 13, 14 and 15, the fuse or fuse-link is a strip 19 of relatively wide fusible electrically conductive metal, which is drawn together or pinched together for a part of its length to form a substantially tube-like portion 20 shown in cross-section in Fig. 15, the opposed interior sides of which provide opposed internal heat radiation surface areas. The portions 21, 21' of this tube are covered either outside, or both inside and outside, with the dielectric substance 12, 12' before mentioned, the middle portion or section A is covered with the substance such as bismuth, and zones BB' of restricted radiation and a predetermined blow-out section A are thus provided. When the current exceeds a specified value the mid section or zone A first melts and breaks down and the consequent actions are the same as those heretofore described. It will be readily understood from the drawings and the above description that this form of fuse or fuse-link may be provided if desirable with a plurality of predetermined blow-out zones such as A and a greater number of zones BB' of restricted radiation.

Referring to Figs. 16, 17 and 18, the fuse or fuse-link is a trip 22 of relatively wide fusible electrically conductive metal, which for a part of its length is drawn together or pinched together at two separated points to form contracted portions 23 and 24, having sides of considerable outward curvature, the portions 23 and 24 being separated by a flattened out or widened portion 25 of the strip having sides of less outward curvature than the portions 23 and 24, the opposed sides of the portions 23 and 24 providing opposed internal heat radiation areas. The mid portion of the strip for a distance on either side of its middle cross-sectional line is coated both on the exterior and interior with the dielectric substance 12 before mentioned, a predetermined drop-out section or zone A and blow-out zones BB' thus being provided. When the current exceeds a specified value the contracted zones BB' first melt and break down, the zone A drops out, and the consequent actions are the same as those heretofore described. In this instance also it will be readily understood from the drawings and the above description that if desirable the fuse or fuse-link may be provided with a plurality of predetermined drop-out zones such as A, and a greater number of blow-out zones BB'.

Referring to Figs. 19 and 20, the fuse-link is a split tube 26 of fusible electrically conductive metal, the opposed interior sides of the tube providing opposed internal heat radiation surface areas. The tube 26 is coated for a portion of its length, on the outside, with the substance 11 such as bismuth, and a portion of the tube on either side of said coated portion is covered with the dielectric substance 12, 12', before mentioned, a predetermined blow-out zone A is thus provided for the fuse-link, which zone is of different electrical resistance and heat conductivity from the rest of the fuse-link and zones of restricted heat radiation BB' are provided. When the current exceeds a specified value the section or zone A first melts and breaks down and the consequent actions are the same as heretofore described.

Referring to Fig. 21, the fuse or fuse-link is a rod or wire 27 of fusible conductive metal having formed thereby separated helix coil portions 28 and 29, the opposed interiors of which coils provide opposed internal heat radiation surface areas. The coils and a portion of the wire between the coils are covered with the dielectric substance 12 before mentioned. A predetermined drop-out section or zone A and blow-out zones BB' of restricted radiation are thus provided, and when the current exceeds a specified value the sections or zones BB' first melt and break down and the consequent actions are the same as heretofore described. It will be understood that this form of fuse-link may be provided with a plurality of drop-out zones A and a greater number of blowout zones BB', by forming a greater number of helix coils of the wire and covering them and the intervening portions with the dielectric substance mentioned.

Referring to Figs. 22 and 23, which is also a cross-section of Fig. 22, the fuse or fuse-link is similar to the one last described except that it has a single helix coil 30 of extended form providing a single predetermined blow-out and restricted radiation zone A, and the zone portion A of the fuse link being fusible by a lesser degree of heat than the adjacent sections constitutes a predetermined blow out section.

Having thus described my invention, it should be understood that there may be modifications thereof and variations therein without departing from the spirit of the invention or exceeding the scope of the appended claims.

What I claim and desire to protect by Letters Patent is:

1. In a fuse link, a bent metal fusible conductor providing opposed internal heat radiation surfaces, said metal laminated between layers of a metal of lower melting point than said conductor.

2. In a fuse-link, fusible electric current conducting metal formed for providing opposed internal heat radiation surface areas, spaced portions of the heat radiation surface areas, and an intervening portion of the metal between said spaced portions; said spaced portions constituting zones of restricted heat radiation.

3. A fuse-link comprising a metallic conductor, and a fusible covering on a section of the conductor for providing a predetermined break down portion of the fuse-link under excessive load and retarding volatilization of the melted conductor in said portion until fusing of said covering.

4. A fuse-link comprising a metallic conductor, and a covering of bismuth on a predetermined section of the conductor.

5. A fuse-link comprising a metallic conductor formed to provide opposed internal heat radiation surfaces, and a fusible covering on a section of the conductor for providing a predetermined break down portion of the conductor under excessive load and retarding volatilization of the melted conductor in said portion until fusing of said covering.

6. A fuse-link comprising a metallic conductor, a fusible covering on a section of the conductor for providing a predetermined break down portion of the conductor under excessive load and retarding volatilization of the melted conductor in said portion until fusing of said covering, and dielectric coverings on sections of the conductor adjacent to the first mentioned section for providing a gap in the broken down fuse-link and forming with the oxide of the melted conductor dielectric coatings for the ends of the conductor which are spaced apart by said gap.

7. A fuse-link comprising a metallic conductor formed for providing opposed internal heat radiation surfaces, a fusible covering on a section of the conductor for providing a predetermined break down portion of the conductor under excessive load and retarding volatilization of the melted conductor in said portion until fusing of said covering, and dielectric coverings on sections of the conductor adjacent to the first mentioned section for providing a gap in the broken down fuse-link and forming with the oxide of the melted conductor dielectric coatings for the ends of the melted conductor which are spaced apart by said gap.

8. A fuse-link comprising a metallic conductor, a covering of bismuth on a predetermined section of the conductor, and dielectric coverings on the conductor adjacent to the first mentioned section.

9. A fuse-link comprising a metallic conductor, a covering of electric conducting substance of relatively lower melting point than the conductor on a predetermined section of the conductor, and coverings of electrical and heat insulating substances on sections of the conductor adjacent to the first mentioned section.

10. A fuse-link comprising a metallic conductor having a predetermined break down portion under excessive load, and covering substances on sections of the conductor for providing a gap in the broken down fuse-link and forming with the oxide of the melted conductor dielectric coatings for the ends of the conductor spaced apart by said gap.

11. A fuse link comprising a metallic substance of relatively high electrical conductivity but of relatively low melting point; a layer of lower melting point heat conducting substance thereon; a layer of higher melting point electrical insulating and heat retarding substance also thereon; said layers separately spaced along the metallic substance in predetermined sections, whereby to restrain the melted metallic substance in said sections from vaporization for different periods of time.

12. A fuse-link comprising a metallic conductor, an electric conducting substance of relatively lower melting point than the conductor laminated on a predetermined section of the conductor, and electrical and heat insulating substances of relatively higher melting point than the conductor adjacent to the first mentioned section.

13. A fuse-link comprising a metallic conductor, a covering of electrically conducting substance of higher electrical resistivity and less heat conductivity than the conductor for providing a predetermined break down portion of the fuse link under excessive load and retarding volatilization of the melted conductor in said portion until melting of said covering, and coverings of dielectric substance of a predetermined degree of heat absorption quality and fusibility for providing a gap in the broken down fuse-link and forming with the oxide of the melted conductor dielectric coatings for the ends of the conductor which are spaced apart by said gap.

14. The method of making a fuse-link which consists in covering a section of the metallic conductor with an electrically conducting substance of higher electrical resistivity and less heat conductivity than the conductor for providing a predetermined break down portion of the conductor under excessive load and retarding volatilization of the melted conductor in said portion until melting of said substance.

15. The method of making a fuse-link which consists in forming the metallic conductor to provide opposed internal heat radiation surfaces and covering a section of the conductor with an electrically conducting substance of higher electrical resistivity and less heat conductivity than the conductor for providing a predetermined break down portion of the conductor under excessive load and retarding volatilization of the melted conductor in said portion until melting of said substance.

16. The method of making a fuse-link which consists in covering a section of the conductor with an electrically conducting substance of higher electrical resistivity and less heat conductivity than the conductor for providing a predetermined break down portion of the conductor under excessive load and retarding volatilization of the melted conductor in said portion until melting of said substance, and covering sections of the conductor adjacent to the first mentioned section with electrical and heat insulating substances of relatively higher melting point than the conductor for providing a gap in the broken down fuse-link and forming with the oxide of the melted conductor dielectric coatings for the ends of the conductor which are spaced apart by said gap.

17. The method of making a fuse-link which consists in forming the metallic conductor to provide opposed internal heat radiation surfaces and covering a section of the conductor with an electrically conducting substance of higher electrical resistivity and less heat conductivity than the conductor for providing a predetermined break down portion of the conductor under excessive load and for retarding volatilization of the melted conductor in said portion until melting of said substance, and covering sections of the conductor adjacent to the first mentioned section with electrical and heat insulating substances of relatively higher melting point than the conductor for providing a gap in the broken down fuse link and forming with the oxide of the melted conductor dielectric coatings for the ends of the conductor spaced apart by said gap.

18. The herein described method of making a fuse-link which consists in forming the electric current conducting metal of the fuse-link to provide opposed internal heat radiation surface areas and completely covering the heat radiation surface areas with dielectric material.

19. The herein described method of making a fuse-link which consists in forming the electric current conducting metal of the fuse-link to provide opposed internal heat radiation surface areas, covering sections of said heat radiation surface areas with dielectric material, said material spaced to define zones of said areas which are more quickly fusible than the covered sections.

ROBERT M. BIRD.